(12) United States Patent
Woo et al.

(10) Patent No.: US 10,651,703 B2
(45) Date of Patent: May 12, 2020

(54) HOUSING AND MOTOR INCLUDING SAME

(71) Applicant: LG Innotek Co., Ltd., Seoul (KR)

(72) Inventors: Shung Hun Woo, Seoul (KR); Seong Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 62 days.

(21) Appl. No.: 15/750,454

(22) PCT Filed: Aug. 1, 2016

(86) PCT No.: PCT/KR2016/008435
§ 371 (c)(1),
(2) Date: Feb. 5, 2018

(87) PCT Pub. No.: WO2017/023061
PCT Pub. Date: Feb. 9, 2017

(65) Prior Publication Data
US 2018/0226847 A1 Aug. 9, 2018

(30) Foreign Application Priority Data
Aug. 3, 2015 (KR) .................. 10-2015-0109564

(51) Int. Cl.
*H02K 3/487* (2006.01)
*H02K 5/04* (2006.01)
(Continued)

(52) U.S. Cl.
CPC ............ *H02K 3/487* (2013.01); *H02K 1/185* (2013.01); *H02K 5/04* (2013.01); *H02K 5/163* (2013.01); *H02K 7/085* (2013.01); *H02K 5/16* (2013.01)

(58) Field of Classification Search
CPC .......... H02K 5/12; H02K 5/128; H02K 5/167; H02K 5/04; H02K 5/163; H02K 5/16;
(Continued)

(56) References Cited

U.S. PATENT DOCUMENTS 5,698,917 A * 12/1997 Shultz ................. F16C 32/0465
310/214
2003/0230950 A1 12/2003 Reimann

FOREIGN PATENT DOCUMENTS

CN 1780091 A 5/2006
DE 2101 672 A1 7/1972
(Continued)

OTHER PUBLICATIONS

Supplementary European Search Report dated Jan. 30, 2019 in European Application No. 16833297.1.
(Continued)

*Primary Examiner* — Alfonso Perez Borroto
*Assistant Examiner* — Alexander A Singh
(74) *Attorney, Agent, or Firm* — Saliwanchik, Lloyd & Eisenschenk

(57) ABSTRACT

The present invention provides a housing including a teeth support part formed to protrude from the inner bottom surface thereof so as to come into contact with the end surfaces of stator teeth and support the same, and thus provides an advantageous effect of preventing the generation of cogging torque, which can occur because of the non-uniform assembly of a stator.

9 Claims, 5 Drawing Sheets

(51) Int. Cl.
*H02K 1/18* (2006.01)
*H02K 5/16* (2006.01)
*H02K 7/08* (2006.01)

(58) Field of Classification Search
CPC .......... H02K 7/085; H02K 3/34; H02K 3/487;
H02K 3/345; H02K 3/493
USPC .................... 310/43, 85–89, 156.12–156.14,
310/156.28–156.31, 214, 215
See application file for complete search history.

(56) References Cited

FOREIGN PATENT DOCUMENTS

| EP | 1 376 822 A1 | 1/2004 |
|----|--------------|--------|
| JP | 60-91852 A | 5/1985 |
| JP | 60-167639 A | 8/1985 |
| JP | 2000-037068 A | 2/2000 |
| JP | 2005-210838 A | 8/2005 |
| JP | 2006-121870 A | 5/2006 |
| JP | 2008-236973 A | 10/2008 |
| KR | 10-2007-0040913 A | 4/2007 |

OTHER PUBLICATIONS

International Search Report in International Application No. PCT/KR2016/008435, filed Aug. 1, 2016.
Office Action dated Jun. 28, 2019 in Chinese Application No. 201680046029.0.

* cited by examiner

HOUSING AND MOTOR INCLUDING SAME

CROSS-REFERENCE TO RELATED APPLICATIONS

This application is the U.S. national stage application of International Patent Application No. PCT/KR2016/008435, filed Aug. 1, 2016, which claims priority to Korean Application No. 10-2015-0109564, filed Aug. 3, 2015, the disclosures of each of which are incorporated herein by reference in their entirety.

TECHNICAL FIELD

The present invention relates to a motor housing and a motor including the same, and more specifically, to a motor housing including a stator having a plurality of teeth formed inward from a stator core, and a motor including the same.

BACKGROUND ART

Cogging torque, which is non-uniform torque of a stator necessarily generated in a motor using a permanent magnet, refers to radial torque for moving to an equilibrium state, that is, a position at which magnetic energy of the motor is minimal.

An abrupt change in magnetic flux around a boundary between N and S poles of a magnet generates the cogging torque. The cogging torque causes noise and vibration and reduces the performance of a motor, and thus it is important to reduce the cogging torque. Particularly, it is very important to reduce the cogging torque of a motor used for an actuator for controlling a precise position.

Teeth of a stator and a magnet of a rotor are disposed to face each other, and cogging caused by a change in magnetic flux density may be generated in an edge area of the teeth of the stator. Particularly, when end surfaces of the teeth of the stators do not form a perfect circle, cogging torque may be generated.

Technical Problem

The present invention is directed to providing a motor housing which reduces cogging torque by inducing end surfaces of teeth of a stator to form a perfect circle, and a motor.

Objects of the present invention are not limited to the above-described objects and other objects that have not been described should be clearly understood by those skilled in the art from the following description.

Technical Solution

One aspect of the present invention provides a housing comprising a teeth support part configured to protrude from an inner bottom surface and come in contact with end surfaces of teeth of a stator.

The teeth support part may be configured to protrude in a cylindrical shape, and an outer diameter of the teeth support part is equal to an inner diameter of a virtual circle formed by end surfaces of the plurality of teeth.

The teeth support part may include a guide protruding from an outer face thereof and is disposed between the teeth adjacent to each other.

The housing may include a bearing pocket part configured to accommodate a bearing is disposed in side the teeth support part.

An inner diameter of the teeth support part may be equal to an outer diameter of the bearing pocket portion.

The teeth support part and the bearing pocket part may be integrally formed.

Another aspect of the present invention provides a motor comprising a shaft, a rotor including a hole in which the shaft disposed, a stator disposed outside the rotor; and a housing accommodating the rotor and the shaft, wherein the stator including a plurality of teeth, wherein the housing including a teeth support part configured to protrude from an inner bottom surface and come in contact with end surfaces of the teeth of the stator to support the end surfaces of the teeth of the stator.

The teeth support part may be configured to protrude in a cylindrical shape, and an outer diameter of the teeth support part is equal to an inner diameter of a virtual circle formed by end surfaces of the plurality of teeth.

The teeth support part may include a guide protruding from an outer face thereof and is disposed between the teeth adjacent to each other.

The guide may be formed at regular intervals on the outer surface of the teeth support part along the circumferential direction.

A width of the guide in the circumferential direction may correspond to the length between the end surfaces of the adjacent teeth.

Advantageous Effects

According to an embodiment of the present invention, a motor housing and a motor including the same provide an advantageous effect of preventing the generation of cogging torque caused by the non-uniform assembly of a stator by a teeth support part formed to protrude from a bottom surface of the housing and coming in contact with end surfaces of teeth of the stator to support the same.

MODES OF THE INVENTION

Hereinafter, exemplary embodiments of the present invention will be described in detail with reference to the accompanying drawings. Purposes, specific advantages, and novel features of the present invention will be clear from exemplary embodiments and the following detailed description in connection with the accompanying drawings. Terms and words used in this specification and claims should not be interpreted as limited to commonly used meanings or meanings in dictionaries and should be interpreted with meanings and concepts which are consistent with the technological scope of the present invention based on the principle that the inventors have appropriately defined concepts of terms in order to describe the present invention in the best way. When describing the present invention, detailed descriptions of related well-known technique that are deemed to unnecessarily obscure the gist of the present invention will be omitted.

It should be understood that when an element is referred to as being "connected" or "coupled" to another element, the element may be directly connected or coupled to the other element or an intervening elements may be present. In contrast, when an element is referred to as being "directly connected" or "directly coupled" to another element, there are no intervening elements present.

Figure 1:
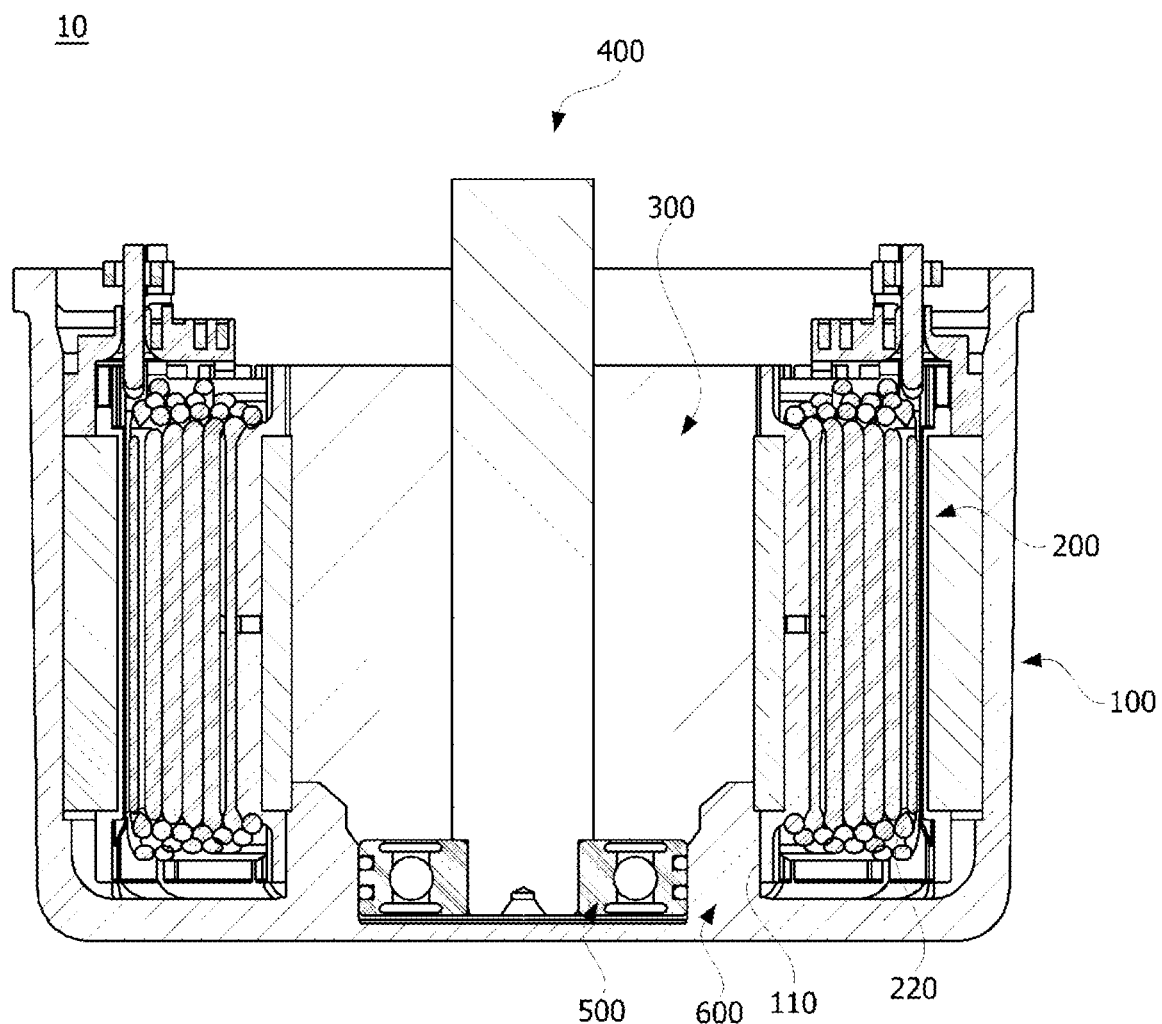
FIG. 1 is a view showing a motor according to one exemplary embodiment of the present invention.

FIG. 1 is a view showing a motor according to one exemplary embodiment of the present invention.

Referring to FIG. 1, a motor 10 according to the present invention may include a housing 100, a stator 200, a rotor 300, and a shaft 400.

The housing 100 has a cylindrical shape and has a space in which the stator 200 and the rotor 300 may be mounted. In this case, the shape and the material of the housing 100 may be variously changed, but a metal material, which is able to endure even a high temperature, may be selected because the housing 100 is mounted in a vehicle.

Figure 2:
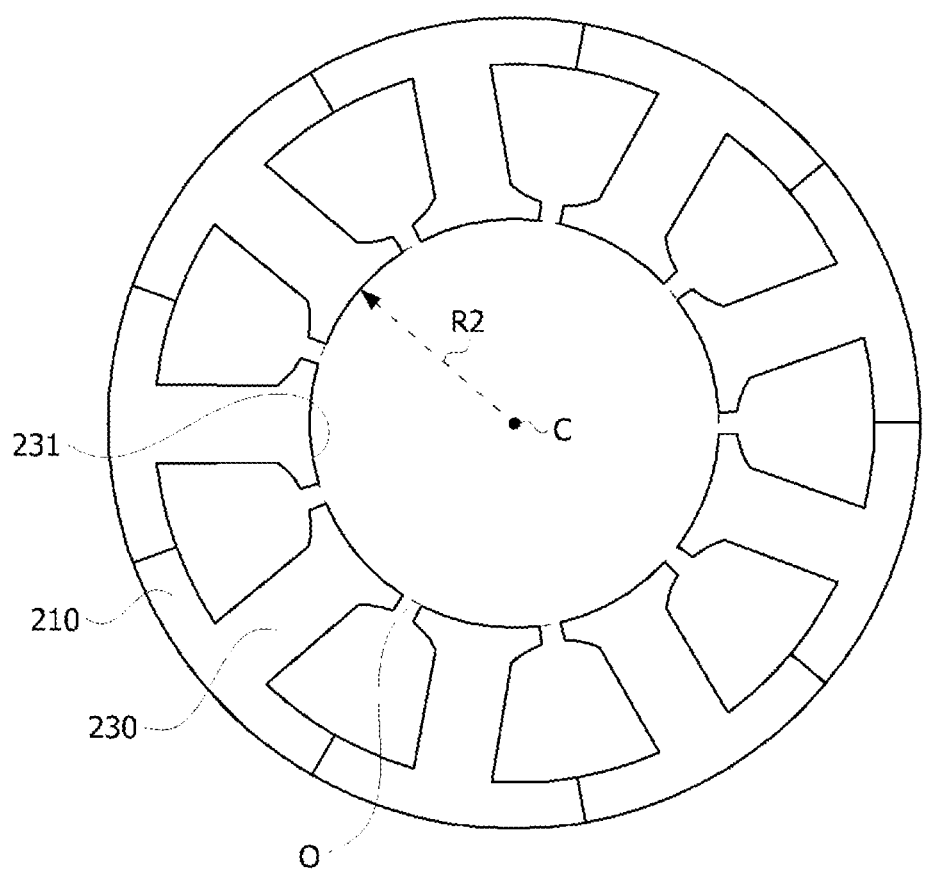
FIG. 2 is a view showing a stator.

FIG. 2 is a view showing a stator.

Referring to FIG. 2, the stator 200 may include a stator core 210, and the stator core 210 may include a coil 220 (shown in FIG. 1) wound therearound and forming a rotating magnetic field. The coil 220 wound around the stator core 210 may be surrounded and insulated by an insulating material. Meanwhile, the stator core 210 may be formed by combining a plurality of divided cores.

The stator core 210 includes a plurality of teeth 230 extending inward. Although a total of 9 teeth 230 are shown in FIG. 2, the motor according to one embodiment of the present invention is not limited thereto, and may be variously changed depending on the number of poles of the motor.

A space between the adjacent teeth 230 corresponds to a slot space in which the coil is wound.

End portions of the teeth 230 expand in a width direction and may be disposed toward a center C of the stator core 210. In this case, end surfaces 231 of the teeth 230 form a virtual perfect circle O with respect to the center C of the stator core 210 to reduce cogging torque.

Referring to FIG. 1, the rotor 300 is disposed to rotate with the stator 200. The rotor 300 may include a magnet attached to an inside of a rotor core or attached to an outer circumferential surface of the rotor core. The magnet attached to the rotor 300 causes an electromagnetic interaction with the stator 200 to rotate the rotor 300. A rotating shaft 400 may be coupled to a central portion of the rotor 300. Thus, when the rotor 300 rotates, the rotating shaft 400 is also rotated. In this case, the rotating shaft 400 may be supported by a bearing 500.

The housing 100 of the motor 10 according to one exemplary embodiment of the present invention may include a teeth support part 110 (shown in FIG. 1). The teeth support part 110 comes in contact with end surfaces at lower portions of the teeth 230 of the stator 200 and supports the same to fix the stator 200.

Figure 3:
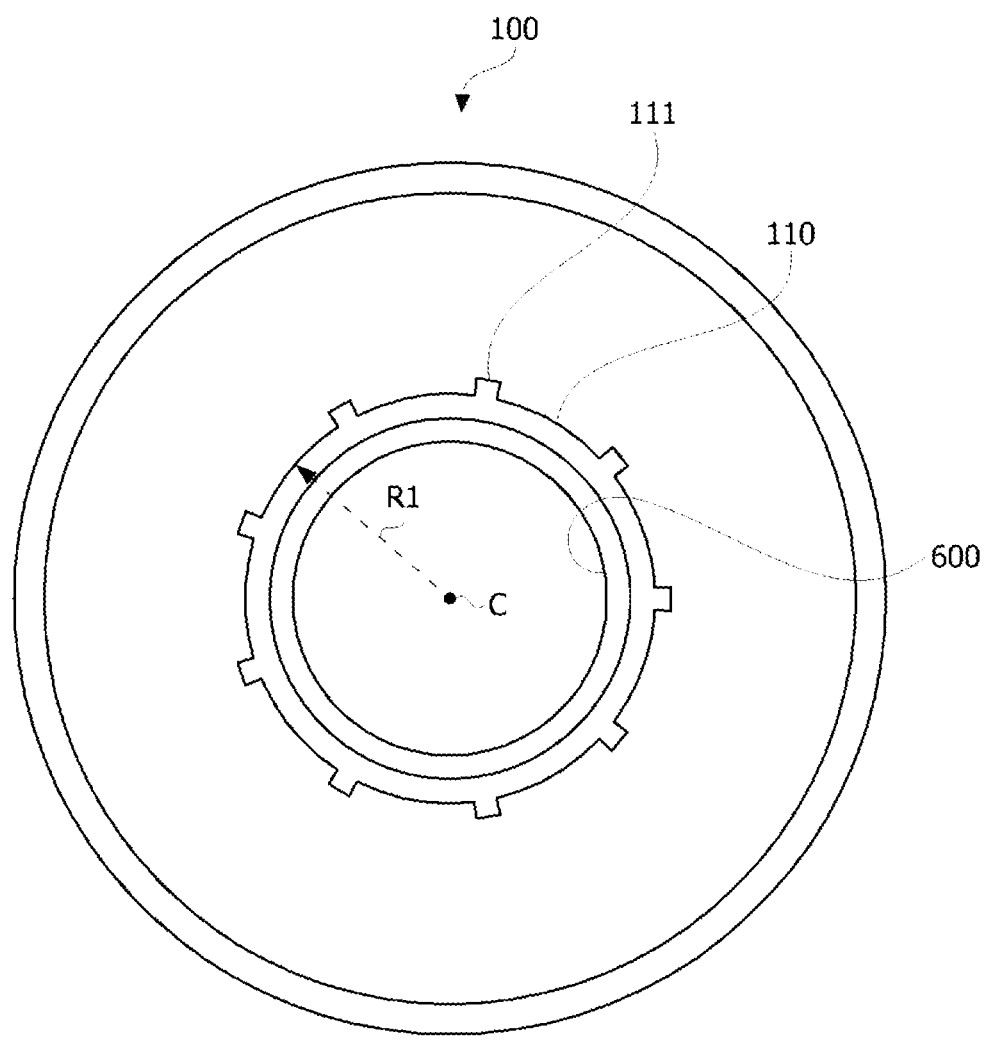
FIG. 3 is a view showing a teeth support part.

FIG. 3 is a view showing a teeth support part. FIG. 3 clearly shows only a main portion to help conceptually and clearly understand the present invention. As a result, various modifications of a diagram are expected, and the scope of the present invention may not be limited by a particular shape shown in the drawing.

Referring to FIGS. 1 and 3, the teeth support part 110 may protrude from a bottom surface of the housing 100. The stator 200 may be formed by combining a plurality of divided stator cores 210, and may be disposed in a misaligned form by not having a perfect circle O (shown in FIG. 2), formed by the end surfaces 231 of the teeth 230, due to assembly tolerance or vibration.

When the end surfaces 231 of the teeth 230 are not aligned in a circumferential direction, a magnetic flux density is changed between the magnet of the rotor 300 and the teeth 230 of the stator core 210 in the circumferential direction, and thus cogging torque may be generated.

In this case, the teeth support part 110 physically fixes the teeth 230 and induces the end surfaces of the teeth 230 formed on the stator core 210 to be aligned in a circumferential direction, and thus prevents the generation of cogging torque.

The teeth support part 110 may protrude upward from a bottom surface of the housing 100 and may have an annular shape so that an outer face comes in contact with the end surfaces 231 of the teeth 230 of the stator core 210. Therefore, an outer diameter R1 (shown in FIG. 3) of the teeth support part 110 may be formed to correspond to an inner diameter R2 (shown in FIG. 2) of a virtual perfect circle O (shown in FIG. 2) formed by the plurality of teeth 230.

As shown in FIG. 1, as one embodiment of the teeth support part 110, the teeth support part 110 may be formed as an outer face of the bearing pocket part 600. The bearing pocket part 600 refers to an element protruding from a bottom surface of the housing 100 to form an accommodation space therein so that the bearing 500 is accommodated in the accommodation space. The accommodated bearing 500 rotatably supports the rotating shaft 400.

The inner face of the bearing pocket part 600 is fixed to an outer ring of the accommodated bearing 500, and the outer face may be used as the teeth support part 110 supporting the end surfaces 231 of the teeth 230.

Figure 4:
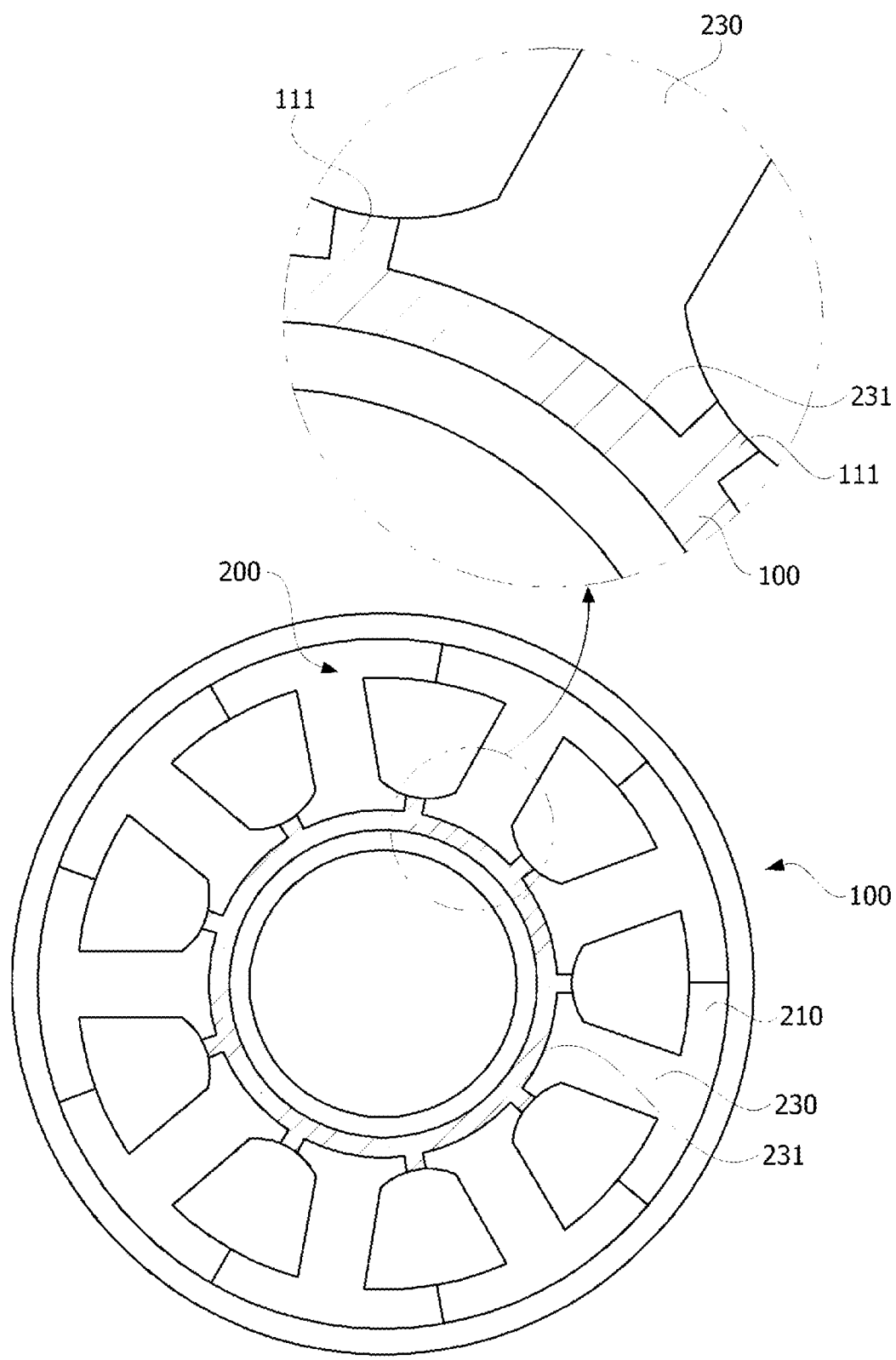
FIG. 4 is a view showing a stator inserted into the teeth support part.

FIG. 4 is a view showing a stator inserted into the teeth support part.

Referring to FIGS. 3 and 4, the teeth support part 110 may include a guide 111.

The guide 111 protrudes from an outer face of the teeth support part 110 and may be inserted into a gap between the end surfaces 231 of mutually adjacent teeth 230. The guide 111 may be formed long in an axial direction of the rotating shaft 400. Guides 111 may be formed at the outer face of the teeth support part 110 at regular intervals in a circumferential direction. In the circumferential direction, a space between mutually adjacent guides 111 may be formed to correspond to a width of an end portion of the teeth 230.

That is, the adjacent guides 111 and the outer face of the teeth support part 110 between the guides 111 form a slot into which an end portion of the teeth 230 is inserted, and fix positions of the teeth 230 so that the end surfaces 231 of the teeth 230 form a perfect circle O (shown in FIG. 2).

The end surfaces of the teeth 230 may not be aligned due to an assembling process of the stator core 210 or external vibration, and the teeth support part 110 aligns and fixes the stator cores 210 so that an inner circumferential surface of the stator 200 has a perfect circle. Thus, a change in magnetic flux density between the magnet of the rotor 300 and the teeth 230 is minimized, and the generation of cogging torque can be prevented.

When an outer face of the bearing pocket part 600 is used as the teeth support part 110, the guide 111 may be easily formed by convexly protruding from an outer face of the bearing pocket part 600.

Figure 5:
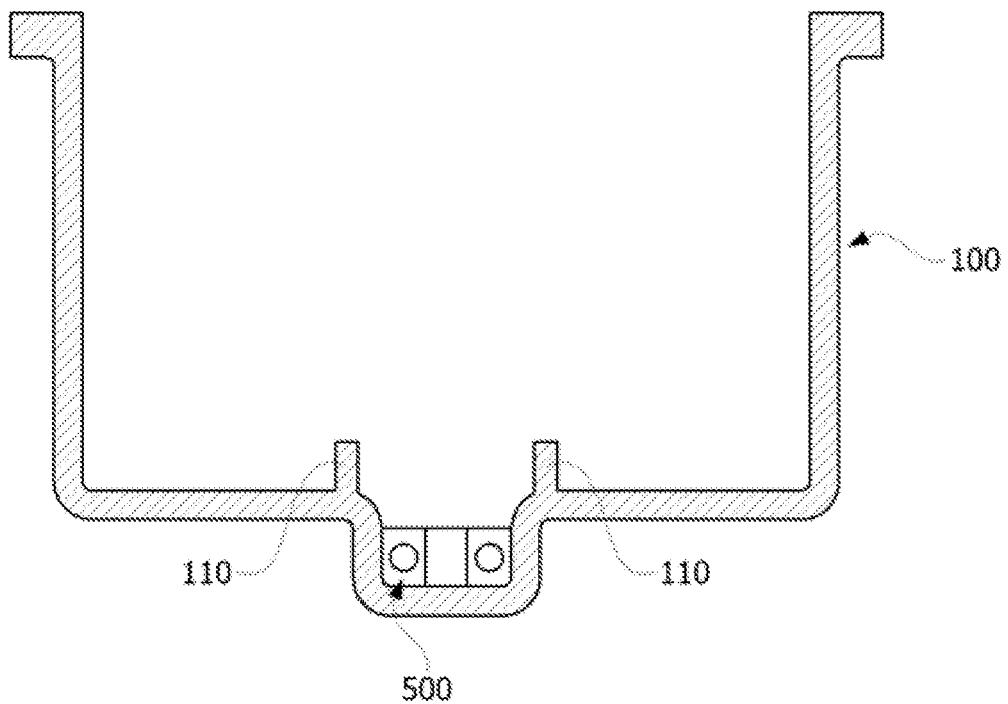
FIG. 5 is a view showing a modified example of the teeth support part.

FIG. 5 is a view showing a modified example of the teeth support part.

Referring to FIG. 5, as a modified example of the teeth support part 110, the teeth support part 110 may be formed as a separate member protruding from a bottom surface of the housing 100 rather than as a part of the bearing pocket part 600, separately from the bearing pocket part 600. The teeth support part 110 may also have an annular shape to correspond to an inner circumferential area formed by the end surfaces of the teeth 230 of the stator 200.

The motor housing according to one exemplary embodiment of the present invention and the motor including the same have been described in detail with reference to the accompanying drawings.

While the present invention has been particularly described with reference to exemplary embodiments, it should be understood by those of skilled in the art that various changes, modifications, and replacements in form and details may be made without departing from the spirit and scope of the present invention. Therefore, the exemplary embodiments and claims disclosed in the present invention should be considered in a descriptive sense only and not for purposes of limitation. Accordingly, the scope of the present invention is not limited by the embodiments and the accompanying drawings. The scope of the present invention should be defined by the appended claims, and encompasses all modifications and equivalents that fall within the scope of the appended claims.

DESCRIPTION OF SYMBOLS

10: MOTOR
100: HOUSING
200: STATOR
210: STATOR CORE
220: COIL
230: TEETH
231: END SURFACES
300: ROTOR
400: ROTATING SHAFT
500: BEARING
600: BEARING POCKET PART

The invention claimed is:

1. A housing comprising:
a teeth support part configured to protrude from an inner bottom surface and come in contact with end surfaces of a plurality of teeth of a stator,
wherein the teeth support part is configured to protrude in a cylindrical shape and has an outer diameter corresponding to an inner diameter of a virtual circle formed by end surfaces of the plurality of teeth,
wherein the teeth support part includes a guide protruding from an outer surface thereof and that is disposed between teeth adjacent to each other,
wherein a width of the guide in a circumferential direction equals a distance between the end surfaces of the adjacent teeth, and
wherein an outer upper surface of the guide and inner bottom surfaces of the adjacent teeth form a shape of an arc.

2. The housing of claim 1, wherein the housing includes a bearing pocket part configured to accommodate a bearing disposed inside the teeth support part.

3. The housing of claim 2, wherein an inner diameter of the teeth support part is equal to an outer diameter of the bearing pocket portion.

4. The housing of claim 3, wherein the teeth support part and the bearing pocket part are integrally formed.

5. A motor comprising;
a housing;
a stator disposed inside the housing;
a rotor disposed inside the stator; and
a shaft coupled to the rotor,
wherein, the stator includes a plurality of teeth therein;
wherein the housing includes a teeth support part configured to protrude from an inner bottom surface and come in contact with end surfaces of the teeth of the stator,
having a stator core, wherein end portions of the teeth expand in a width direction and are disposed toward a center of the stator core, wherein the teeth support part is configured to protrude in a cylindrical shape and has an outer diameter corresponding to an inner diameter of a virtual circle formed by end surfaces of the plurality of teeth with respect to the center of the stator core, wherein a bearing pocket part is configured to accommodate a bearing, wherein an inner face of the bearing pocket part is fixed to an outer ring of the accommodated bearing, and an outer face of the bearing pocket part is configured to support the end surfaces of the teeth,
wherein the teeth support part includes a guide protruding from an outer face thereof and that is disposed between teeth adjacent to each other, and
wherein an outer upper surface of the guide and inner bottom surfaces of the adjacent teeth form a shave of an arc.

6. The motor of claim 5, wherein the guide is formed at regular intervals on the outer surface of the teeth support part along a circumferential direction.

7. The motor of claim 5, wherein a width of the guide in a circumferential direction corresponds to the length between the end surfaces of the adjacent teeth.

8. The motor of claim 5, wherein an outer diameter of the bearing pocket portion is equal to an inner diameter of the teeth support part.

9. The motor of claim 5, wherein the teeth support part and the bearing pocket part are integrally formed.

* * * * *